(12) United States Patent
Asok et al.

(10) Patent No.: US 12,101,181 B2
(45) Date of Patent: *Sep. 24, 2024

(54) AUTONOMOUS FEEDBACK FOR EFFICIENT ALLOCATION OF WIRELESS SUBCARRIERS

(71) Applicant: Cypress Semiconductor Corporation, San Jose, CA (US)

(72) Inventors: Visakh Asok, Kerala (IN); Suprojit Mukherjee, Kalyani (IN); Prasanna Kumar Sethuraman, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,079

(22) Filed: Oct. 13, 2023

(65) Prior Publication Data

US 2024/0113803 A1 Apr. 4, 2024

Related U.S. Application Data

(63) Continuation of application No. 17/032,400, filed on Sep. 25, 2020, now Pat. No. 11,791,929.

(51) Int. Cl.
| | |
|---|---|
| *H04L 1/00* | (2006.01) |
| *H04B 7/06* | (2006.01) |
| *H04L 5/00* | (2006.01) |
| *H04W 24/02* | (2009.01) |
| *H04W 72/54* | (2023.01) |

(52) U.S. Cl.
CPC .......... *H04L 1/0026* (2013.01); *H04B 7/0626* (2013.01); *H04B 7/0632* (2013.01); *H04L 5/0057* (2013.01); *H04W 24/02* (2013.01); *H04W 72/54* (2023.01)

(58) Field of Classification Search
CPC ... H04L 1/0026; H04L 5/0057; H04L 5/0085; H04B 7/0626; H04B 7/0632; H04W 24/02; H04W 72/08
See application file for complete search history.

(56) References Cited

U.S. PATENT DOCUMENTS

| | | | | |
|---|---|---|---|---|
| 2009/0245188 A1* | 10/2009 | Fukuoka | ............... | H04L 5/0041 370/329 |
| 2013/0136026 A1* | 5/2013 | Yin | ...................... | H04W 24/02 370/252 |

\* cited by examiner

*Primary Examiner* — Habte Mered

(57) ABSTRACT

Implementations disclosed describe systems and methods to optimize allocation of wireless subcarriers to station devices in wireless networks. In an example implementation, the disclosed techniques may include determining, by a station device in a wireless network, that a current set of wireless subcarriers, allocated by an access point device of the wireless network for the station device, is to be changed, generating, by the station device, a feedback information characterizing a current state of one or more of the wireless subcarriers, and sending, by the station device, the feedback information to the access point device.

20 Claims, 6 Drawing Sheets

AUTONOMOUS FEEDBACK FOR EFFICIENT ALLOCATION OF WIRELESS SUBCARRIERS

CROSS-REFERENCE TO RELATED APPLICATION

This application is a Continuation of U.S. patent application Ser. No. 17/032,400, filed on Sep. 25, 2020.

TECHNICAL FIELD

The disclosure pertains to wireless networks, more specifically to improving quality of connections and throughput in wireless systems.

BACKGROUND

Access point devices of wireless networks facilitate wireless communication (transmission and reception) with various client devices (stations). Uplink transmission from station devices to access point devices in wireless networks supporting Very High Throughput IEEE 802.11ac standard occurs sequentially with one station device transmitting at a time. In the newer IEEE 802.1 lax standard, the radio communication channel may be split into non-overlapping frequency regions allocated to various different station devices and used for simultaneous uplink and downlink transmission from and to the respective station devices. Since each station device is allocated only a portion of the total bandwidth, wireless connection to station devices may have an increased sensitivity to various radio disturbances and interferences, in which case the allocated region may provide suboptimal quality of communications.

DETAILED DESCRIPTION

Figure 1:
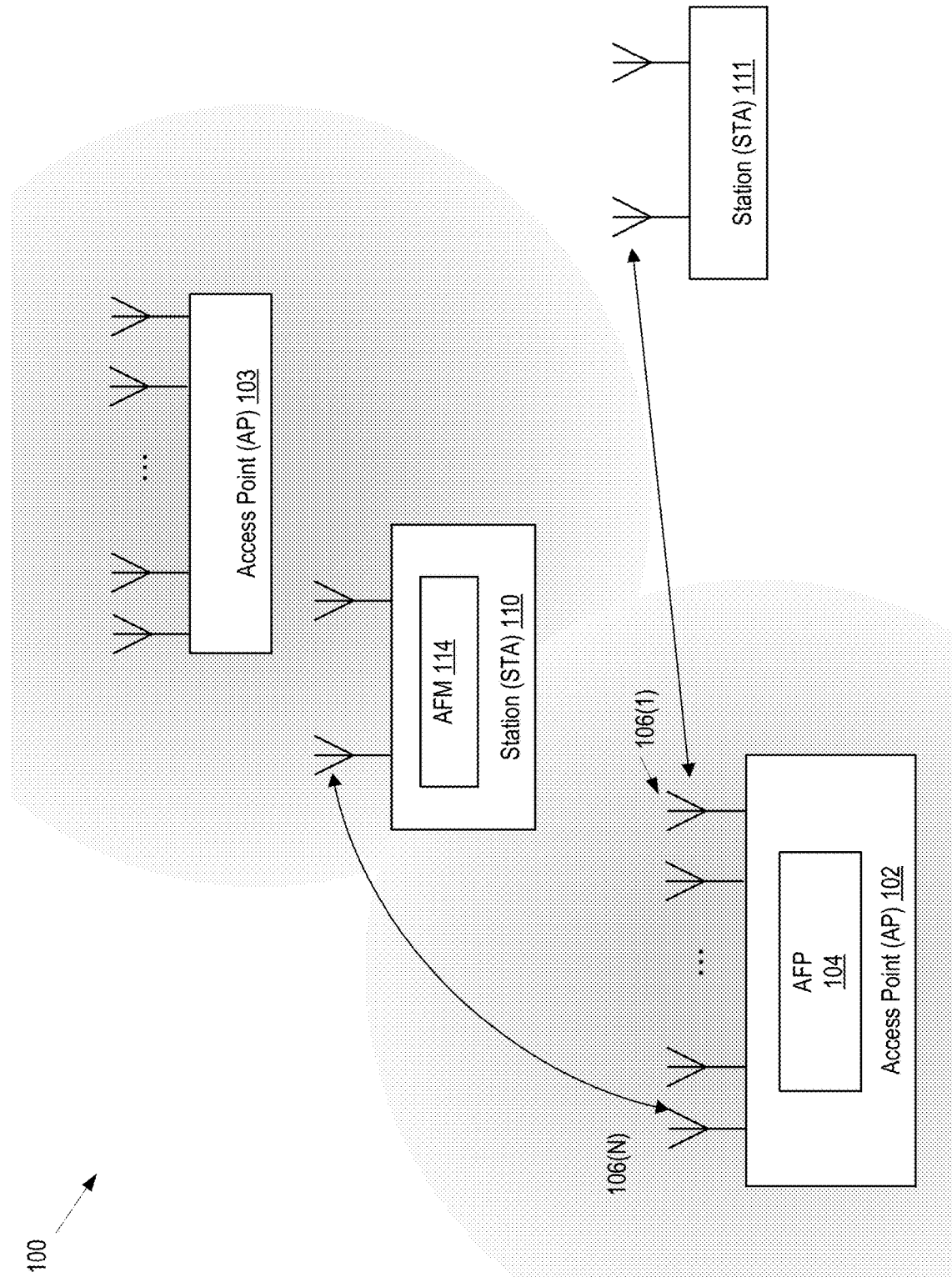
FIG. 1 illustrates one exemplary implementation of a wireless network that has one or more access points and one or more station devices, whose network communications may be optimized by enabling autonomous subcarrier feedback.

Access point devices (AP) of wireless networks may subdivide wireless radio communication channels into smaller subcarriers (or groups of subcarriers referred to as resource units) that may be flexibly allocated among multiple station devices (STA) depending on a radio environment of the wireless network, including quality of transmission between different devices, available transmission paths, etc. To determine allocation of subcarriers among STA, AP may probe the environment by initiating a channel sounding procedure during which a set of sounding signals is output by antennas of AP and received by antennas of various STA. STA may then communicate back to AP the channel sounding feedback that includes information indicative of a quality of radio communication for various subcarriers, as extracted from the received signals. Equipped with this feedback, AP may allocate, to STA, a number of subcarriers for transmission and reception of information to/from AP and additionally perform optimized beamforming, which is tailored for each STA given the contemporaneous conditions of the wireless network environment. As the environmental conditions change with time, AP may repeat the channel sounding exchange and reallocate subcarriers among STA of the wireless network in a way that improves radio communications within the network. However, until AP initiates such a repeated channel sounding exchange, STA may experience a degraded performance.

Aspects of the present disclosure are directed to efficient ways of providing channel sounding feedback from station devices to access points in the instances where AP is not initiating a channel sounding procedure. By proactively detecting deterioration of the wireless network environment by STA and communicating to AP requests for preferred subcarriers, implementations of the present disclosure provide for much faster effectuation of favorable changes in subcarrier allocation, reduce wireless network downtime, and increase network throughput.

Modern wireless network environments often provide wireless connectivity to a large number of client devices (users, stations) using wireless local area networks (WLANs), such as the WiFi® networks, in one implementation. A wireless network may be located in a public place (a store, an airport, a passenger plane or bus) or in a private place (a home, an automotive environment, such as a passenger car, a sport-utility vehicle, and the like). Client STA devices may include laptops, tablets, smart phones, headrest screens, and the like. The wireless networks may include devices equipped with multiple antennas and capable of using MIMO channels for data transmission.

In a crowded environment of a typical wireless network, a line-of-sight radio transmission is not always available as radio waves experience reflection from various obstacles (such as users, walls, furniture, car seats, and so on) resulting in rather complicated interference/diffraction patterns of the radio waves. To allow efficient simultaneous transmission of information to/from multiple STA, periodic sounding of radio channels of transmission may be performed by AP. In particular, AP may form sounding signals probing transmission over multiple subcarriers (resource units) and wait for various STA to communicate channel quality indicator (CQI) reports back to AP. Equipped the with received CQI data, AP can allocate available subcarriers among STA and may tailor using various techniques of beamforming signals output to different STA in order to achieve selective directional enhancement of transmission of intended data packets towards a particular target STA while similarly enhancing radio transmission of other data packets intended for other devices.

Because the wireless environment may be constantly changing, AP may need to perform channel sounding periodically and/or when a quality of transmission to a particular STA deteriorates and the respective throughput drops below an acceptable level. Such channel sounding may add a lot of overhead and/or may not be performed very often. Furthermore, when a sudden onset of interference hinders communication with a particular STA over previously allocated subcarriers, it may take a considerable time (and a number of failed transmissions) for AP to identify that a problem has occurred before AP may send sounding signals to the affected STA. A sounding procedure may take a significant time. For example, in the High Efficiency 802.11ax standard, AP may first send a null data packet announcement (NDPA) frame followed by one or more null data packet (NDP) frame, a beamforming report (BFRP) trigger frame, which may further be separated with interframe spaces. The AP may then wait for STA to provide an CQI report before processing the received report and reallocating subcarriers to STA.

The implementations described herein overcome the challenges and problems set forth above. More specifically, the implementations disclosed enable STA to communicate to AP information indicating that the STA may have been experiencing a radio communication problem. For example, STA may autonomously, without being prompted by AP, communicate to AP channel quality feedback (e.g., unsolicited CQI report) that may help AP to determine which subcarriers should be allocated to STA to address the transmission problem that has occurred. In another example, determination of optimal or preferred subcarriers for STA may be performed on STA end (e.g., using appropriate hardware and/or software resources, as described below) and a list of preferred subcarriers may be provided to AP. The list may include subcarriers identified in association with a quality of transmission that the respective subcarriers are expected to provide. In some implementations, the list may be communicated to AP via a special feedback frame that AP may recognize as a request to change the current allocation of subcarriers. Having received the feedback frame, or the unsolicited CQI report, or any other similar communication indicative of a requested allocation change, AP may reassess a current state of the network and allocate a new set of subcarriers to the requesting STA based on the expected quality of transmission for the requesting STA while taking into account preferences and needs of other devices in the network. For example, if it follows (from the CQI report or the list of preferred subcarriers in the feedback frame) that the requesting $STA_1$ can successfully transmit and receive over two sets of subcarriers (e.g., RU) of frequencies $\{f_1\}$ and $\{f_3\}$, but cannot longer efficiently do so using the currently allocated sets of subcarriers $\{f_2\}$ and $\{f_4\}$, whereas $STA_2$ is expected to properly communicate using all sets of subcarriers $\{f_1\}$, $\{f_2\}$, $\{f_3\}$, $\{f_4\}$, AP may allocate sets of subcarriers $\{f_1\}$ and $\{f_3\}$ to $STA_1$ and move $STA_2$ to sets of subcarriers $\{f_2\}$ and $\{f_4\}$. Such STA-initiated subcarrier allocation (and re-allocation) increases responsiveness of the wireless network to changing environmental conditions, decreases radio transmission downtime, and improves throughput of the network connections. Additionally, by reducing the amount of unsuccessful attempted transmissions power consumption by AP is decreased. In some implementations, the sets of subcarriers may include 26 subcarriers (e.g., combined into RU), and there may be 9 sets within a 20 MHz band. The sets of subcarriers may be indexed using RU index, e.g., RU 1 [−121:−96], RU 2 [−95:−70], RU 3 [−68:−43], RU 4 [−42:−17], RU 5 [−16:−4; 4:16], RU 6 [17:42], RU 7 [43:58], RU 8 [70:95], RU1 [96:121].

FIG. 1 illustrates one exemplary implementation of a wireless network 100 that has one or more access points and one or more station devices, whose network communications may be optimized by enabling autonomous subcarrier feedback. The wireless network 100 may be a wireless local area network (WLAN), wireless wide area network (WWAN), wireless metropolitan area network (WMAN), wireless personal area network (PAN), and so on. In one implementation, wireless network 100 may have one or more access points (base stations), such as AP 102 and/or AP 103, which may be equipped with one or more antennas; e.g., AP 102 may have multiple antennas 106(1) . . . (N). The wireless connection provided by AP 102 may use any bands, such as the 2.4 GHz regulatory domain, the 5 GHz domain, the 60 GHz domain, the 6 GHz domain, or any other frequency band. AP 102 may, in some implementations, include multiple access points, e.g., a first AP operating in a first band (e.g., 2.4 GHz) and a second AP operating in a second band (e.g., 5 GHz), which may use the same or separate antennas 106, some of which may be multiple-input and multiple-output (MIMO) antennas.

The wireless network AP 102 may include one or more client devices (stations), such as station STA 110 and/or STA 111 may be capable of providing autonomous subcarrier feedback to associated AP, in accordance to implementations described herein. In some implementations, STA 110 may include an autonomous feedback module (AFM) 114 to collect information about radio transmission quality provided by various subcarriers of channels/bands utilized by AP 102. Information collected by AFM 114 may be communicated by STA 110 to AP 102 where the communicated information may be processed using autonomous feedback processing (AFP) 104 to change allocation of subcarriers to STA 110 (requesting device) as well as (potentially) other devices of the wireless network, e.g. STA 111.

Numerous scenarios may occur that can benefit from subcarrier reallocation caused by autonomous feedback. In one scenario, another AP, such as AP 103, using the same subcarriers as currently used by STA 110, may be located sufficiently close to STA 110 to cause interference (co-channel interference) with signals exchanged by AP 102 and STA 110, as depicted schematically in FIG. 1. Similarly, interference may be caused by AP 103 using different but closely positioned subcarriers (adjacent channel interference). Responsive to detecting such (or other) types of interference, AFM 114 may identify a set of subcarriers (or cause AP 102 to identify such subcarriers) that would ensure better quality of radio communications than a set of carriers currently allocated to STA 110. AFP 104 of AP 102, having received (or identified) the set of preferred subcarriers may cause AP 102 to implement reallocation of subcarriers among various client devices of the wireless network 100.

In another scenario, a signal-to-noise ratio of the wireless connection between AP 102 and STA 110 (indicated by the double-arrowed line) may degrade since the time when such connection was first established or since the last sounding exchange. Instead of waiting for the next sounding exchange (and experiencing a degraded transmission performance in the meantime), AFM 114 of STA 110 may request reallocation of subcarriers to STA 110.

In another scenario, STA 110 may come out of a power saving state (e.g., "sleep" state) and find that the radio communication with AP 102 has changed (degraded), e.g., due to interference, change in the physical surroundings, and so on. In yet another scenario, STA 110 may have started concurrently utilizing additional wireless connections, such as Long-Term Evolution (LTE) connections or Personal Area Network (PAN) connections whose frequency domain may be sufficiently close to the subcarriers currently allocated to STA 110 by AP 102. In some or all scenarios described above (or other similar scenarios), where a quick reallocation of subcarriers to STA 110 may be beneficial to the quality of wireless communications of STA 110, various implementations of the instant disclosure may significantly improve performance of devices of the wireless network 100.

The wireless network 100 may be implemented in a metropolitan environment, commercial environment, office environment, home environment, automotive environment (or any other transportation environment), and so on.

Figure 2A:
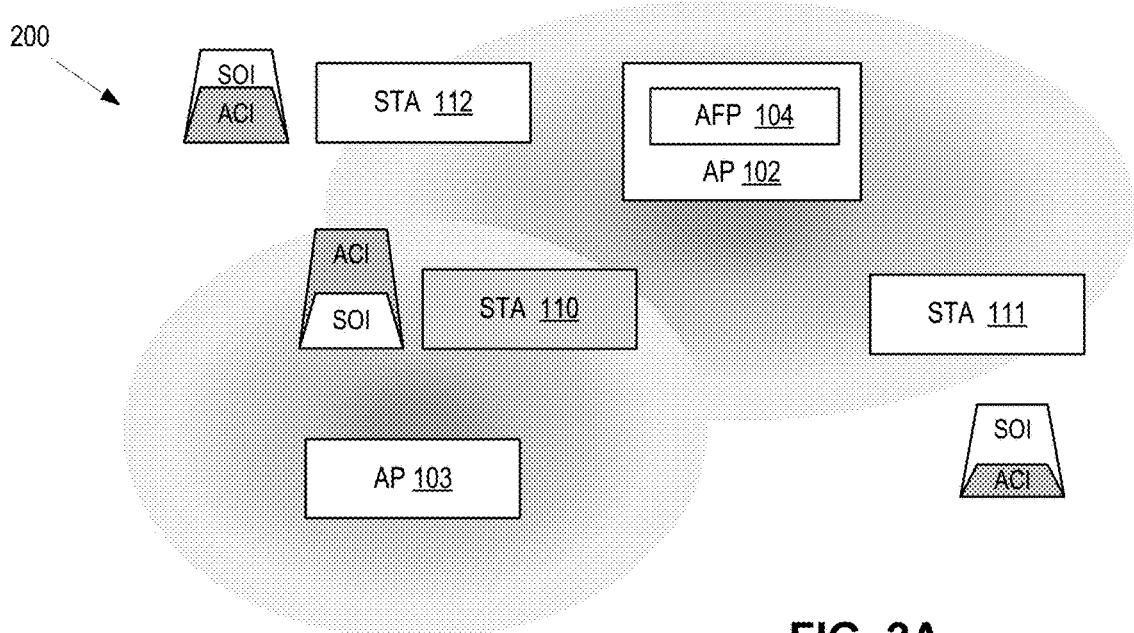
FIG. 2A illustrates one possible example of a wireless network in which provisioning of autonomous subcarrier feedback is used for improving wireless transmission, in accordance with some implementations of the present disclosure.

FIG. 2A illustrates one possible example 200 of a wireless network in which provisioning of autonomous subcarrier feedback is used for improving wireless transmission, in accordance with some implementations of the present disclosure. Shown is AP 102 that provides wireless connection to multiple STA devices, e.g., STA 110, STA 111, STA 112, and so on. Also depicted schematically, for each STA, is a relative strength of a signal of interest (SOI), indicated by white trapezoids, and an interference signal, e.g., adjacent channel interference (ACI), indicated by dark trapezoids (Herein, ACI should be understood as encompassing possible same-channel interference.) In some instances, interference may be caused by AP 103 whereas in other instances interference may be caused by other devices within the same network or by external devices and/or signals not belonging to the wireless network but nonetheless affecting the subcarriers used by STA devices. Whereas STA 111 and STA 112 may have small or moderate amount of ACI compared with SOT (e.g., data signal transmitted from or to the respective STA), STA 110 may experience an amount of interference that makes radio communication inadequate or at least significantly degraded.

Figure 2B:
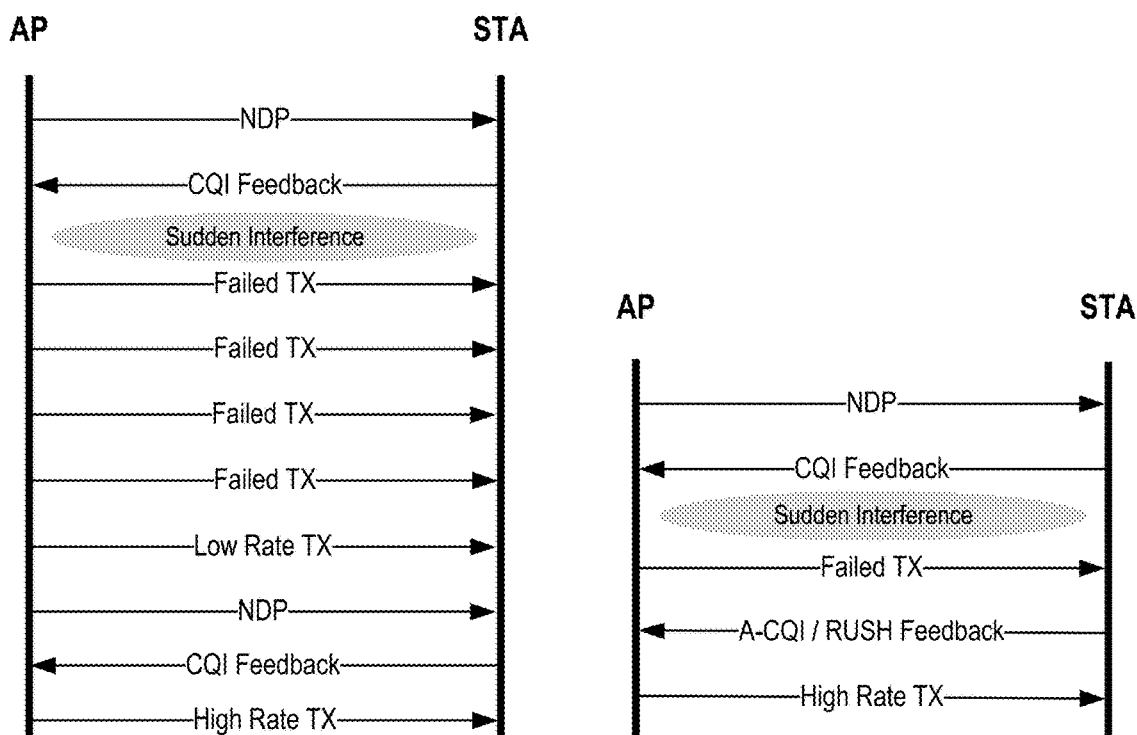
FIG. 2B illustrates a comparison of timelines for a conventional process of reallocation of subcarriers with a process facilitated by autonomous subcarrier feedback provided by a station device, in accordance with some implementation of the present disclosure.

FIG. 2B illustrates a comparison of timelines for a conventional process of reallocation of subcarriers with a process facilitated by autonomous subcarrier feedback provided by a station device, in accordance with some implementation of the present disclosure. As depicted, in both the conventional process (left graph) and the autonomous feedback process (right graph), a sounding exchange may be performed when the wireless connection between AP 102 and STA 110 is first established. The sounding exchange may involve (among other things) AP 102 sending one or more NDP and STA 110 generating a CQI report and providing the CQI report to AP 102. The CQI report may include indications of the strength of signals received by STA 110 via multiple subcarriers that AP 102 is capable of supporting. Using the received CQI report, AP 102 may determine (in the context of other stations supported by AP 102) what subcarriers are to be allocated to STA 110 and use the determined subcarriers to set up subsequent communications with STA 110. At some future instance of time, quality of radio connection may deteriorate, e.g., as a result of interference or changed physical surroundings (which may lead to a degraded SOT to noise ratio), and so on. As a result, transmission (TX) from AP 102 to STA 110 may fail to be received by STA 110. In response to a failed transmission, the conventional process may continue with AP 102 making repeated attempts to transmit data, possibly at lower transmission rates. Eventually, AP 102 may succeed in transmitting data to STA 110 (e.g., at a reduced rate of transmission). Subsequently, AP 102 may initiate a new sounding exchange (again sending NDP and receiving current CQI feedback) before reallocating subcarriers and establishing a new channel of communication with a high rate of transmission.

In the autonomous feedback process, as performed in implementations disclosed herein, an attempted but failed transmission by AP 102 may cause STA 110 to initiate subcarrier reallocation on STA's end. For example, STA 110 may generate a new CQI feedback report autonomously (A-CQI feedback report) indicative of the quality of various subcarriers of the channel used by AP 102. The A-CQI feedback report may indicate, to AP 102, whether the subcarriers currently allocated to STA 110 provide an optimal performance. More specifically, based on strength of signals transmitted by AP 102, STA 110 can compute signal-to-noise ratios (SNRs) for the subcarriers allocated to STA 110 and communicate the computed SNRs to AP 102 using the A-CQI feedback report. The A-CQI feedback report containing low SNRs may inform AP 102 that the current allocation of subcarriers to STA 110 is no longer optimal. Based on the received A-CQI feedback report, AP 102 may determine (e.g., via a new sounding exchange) what subcarriers to allocate to STA 110 to improve transmission. In some implementations, instead of merely reporting strengths of signal propagation in various subcarriers, STA 110 may perform such determination and provide to AP 102 an identification of those channels that would maximize (or improve) radio communication between AP 102 and STA 110. In some implementations, the identified channels may be communicated to AP 102 via a special action frame, which is referred herein as a RUSH (Resource Unit Scheduling Helper) frame. RUSH frame may be a part of the protocol used by AP 102 and STA 110 for wireless communications and may be recognized by AP 102 as a frame containing information about subcarrier allocation that is expected to improve the current communication with the STA, which transmits such a RUSH frame.

RUSH frame may be in a format that is determined by the respective communication protocol and/or agreed upon by AP 102 and STA 110 when the wireless communication is first established (e.g., during the initial association exchange). Various formats of RUSH frames and information contained therein may be utilized. In some implementations, RUSH frames may be of a Preferred Order RUSH type. For example, a Preferred Order RUSH frame may include listings of subcarriers in a preferred (by STA) order of subcarriers: $f_1 \ldots f_N$, from subcarriers that are anticipated to provide best performance under the current conditions (e.g., $f_1$) to subcarriers that are expected to have the worst performance (e.g., $f_N$). For example, the listing of the subcarriers may be in a $[f_1:f_N]$, format, indicating the first subcarrier $f_1$ and the last subcarrier $f_2$ in the range. Tf subcarriers constitute a non-contiguous range of frequencies, multiple ranges may be listed. In some implementations, subcarriers may be grouped into resource units (RU) and identified by appropriate RU index. For example, the smallest unit capable of supporting a wireless connection between AP and STA may have bandwidth $\Delta f$ (which may still encompass multiple subcarriers), and the channel may be divided into M units. In some instances, where a large number of STA are connected to the network, AP 102 may allocate one unit per STA. In some instances, where fewer STA are to be supported, AP 102 may allocate multiple (e.g., two, four, etc.) units to some or all STA. Accordingly, RU in various allocation schemes may be identified using an index that enumerates the smallest units: 0,1,2 . . . M−1. In some implementations, a RUSH frame may identify various RU by the indices of the first and the last smallest units of the respective RU. For example, (2,2) may identify an RU of the size of the smallest unit located at position 2. Similarly, (0,7) may identify a larger RU that includes eight contiguous units 0,1, . . . 7, and so on.

In some implementations, Preferred Order RUSH frame may include an ordered list of desired RU based on the allocation scheme currently deployed by AP 102. For example, if AP 102 is currently using a scheme where each RU includes two minimal units, the preferred RU listing (2,3) (15,16) (0,1) . . . may indicate that the RU containing units 2 and 3 is the RU that is expected to ensure the best possible quality of transmission, followed with RU containing units 15 and 16, followed by RU containing units 0 and 1, and so on. In some implementations, STA 110 may determine that two-unit RU are not likely to guarantee a sufficient quality of transmission. Accordingly, a Preferred Order RUSH frame may include preferred RU that correspond to a different RU allocation scheme than currently deployed by AP 102. For example, an RU listing (2,5) (15,18) (0,1) may indicate that preferred are four-unit RU that contain units 2, 3, 4, and 5 (as the top preference), units 15, 16, 17, and 18 (as the second preference), and so on. In some implementations, Preferred Order RUSH frame may also include widths of unit bandwidth $\Delta f$, the number of smallest units M, a number of RU currently deployed by AP 102, a preferred number of RU being requested by STA 110 to be deployed, a number of spatial streams supported by each RU, and the like.

As another example, a Subcarrier Range RUSH frame may index preferred subcarriers using specific frequency values. In particular, listing of subcarriers $(f_1, f_2)$ $(f_3, f_4)$ . . . may indicate that the top preference of STA 110 is the range of frequencies between $f_1$ and $f_2$, the second choice is the range of frequencies between $f_1$ and $f_2$, and so on.

As another example, an RU Quality RUSH frame may list all or some of the existing RU together with the indications of the current quality of the respective RU. Various RU may also be referenced by the number of spatial streams supported by the respective RU. Specifically, listing of RU (0,3,X,1) (4,7,Y,2) . . . may indicate that the first four-unit RU containing units 0,1,2, and 3 has a quality value X, and can support one spatial stream whereas the second four-unit RU containing units 4,5,6, and 7 has quality value Y and can support two spatial streams.

As another example, a RUSH frame may be a Feedback Trigger Request RUSH frame, which may include the bandwidth of the connection that can be supported by STA. A Feedback Trigger Request (FTR) RUSH frame may also include a feedback category, for which a trigger is requested, such as Very High Throughput (VHT), Radio Measurement Request, Spectrum Management, and the like. A Feedback Trigger Request RUSH frame may further provide an action (to be taken by AP 102) in the context of the indicated feedback category (for which the trigger is requested). For example, if STA 110 detects a degraded SNR within the allocated subcarriers, STA 110 can send an FTR RUSH frame to AP 102 under the VHT category asking AP 102 to trigger CQI feedback from some or all stations in the wireless network. When AP 102 receives FTR RUSH frame, AP 102 may send one or more NDPA frames requesting CQI feedback from various stations in the wireless network. After receiving back the CQI information, AP 102 may use this CQI information to identify the optimal subcarriers to be allocated to STA 110 (as well as, possibly, other stations in the wireless network).

A RUSH frame (of any type) may include several fields of data, such as a field that identifies the frame as a RUSH frame, a field that specifies a type of a RUSH frame (e.g., Preferred Order, RU Quality, etc.), a field that includes RUSH data (e.g., listings of various RU), and so on. The sequence of the included fields may be specified by the wireless protocol used by AP.

Figure 3:
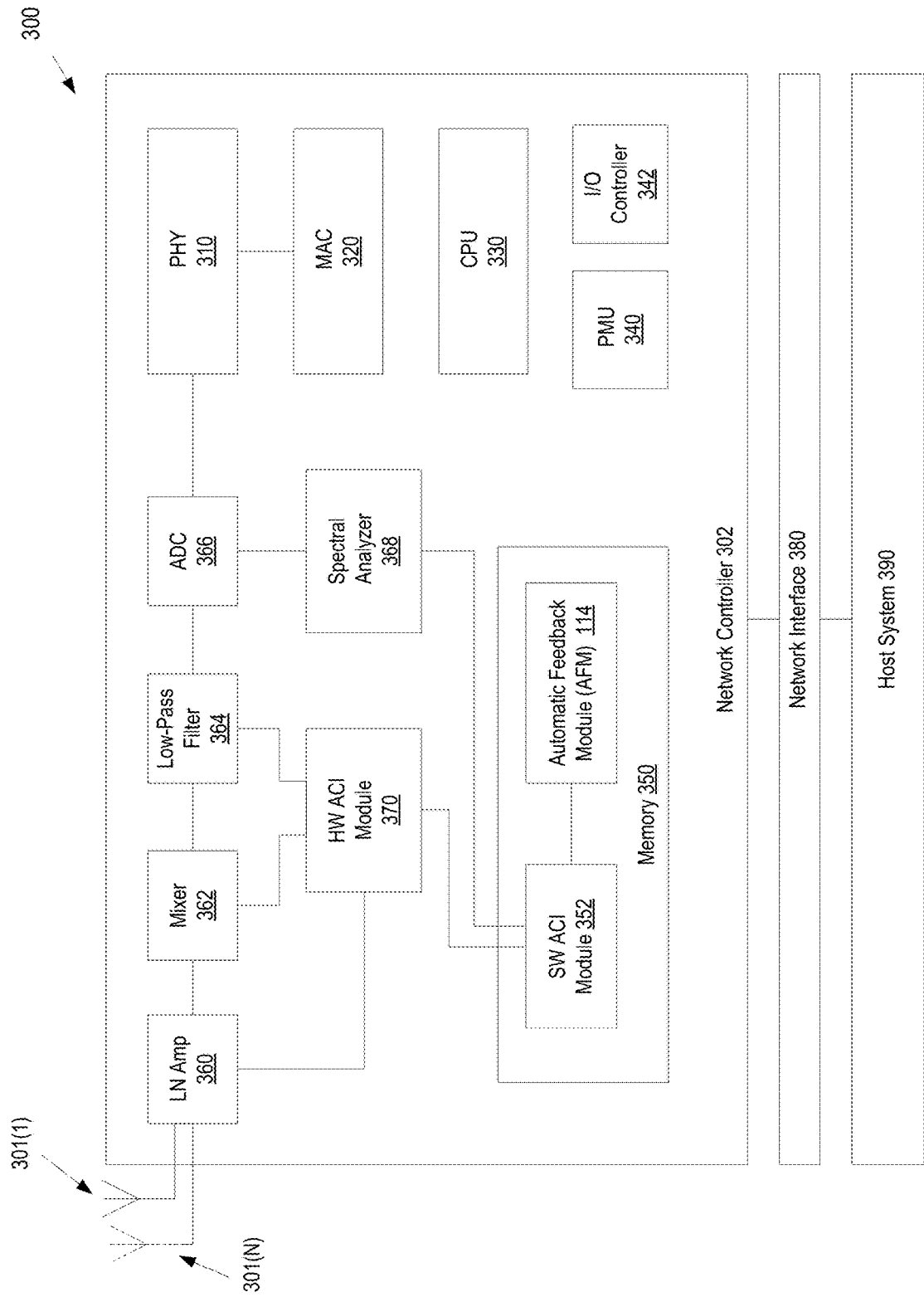
FIG. 3 is a block diagram of one exemplary implementation of a network controller capable of generating and providing autonomous subcarrier feedback, in accordance with some implementations of the present disclosure.

FIG. 3 is a block diagram of one exemplary implementation 300 of a network controller capable of generating and sending autonomous subcarrier feedback, in accordance with some implementations of the present disclosure. In some implementations, the network controller 302 may be implemented as an integrated circuit (IC). Network controller 302 may support various types of wireless networks. In some implementations, network controller 302 may be a WLAN (e.g. a Wi-Fi® local area network) controller, WWAN controller, a PAN (e.g. a Bluetooth®) controller, or a combination thereof. Network controller 302 may use (or be connected to) one or more antennas 301(1) . . . 301(N), to receive and transmit radio waves within frequency ranges used by network controller 302. In some implementations, network controller 302 may be located on a STA device.

Network controller 302 may include a physical layer component (PHY) 310, a medium access control layer (MAC) 320, a central processing unit (CPU) 330, a power management unit (PMU) 340, an input/output (I/O) controller 342, a memory 350, and other components not shown explicitly. PHY 310 may be a 802.11 ac PHY, a 802.11ax PHY, or a PHY configured for any other networking standard. During transmission, PHY 310 may receive frames from MAC 320 (such as 802.11ac MAC, 802.ax MAC or any other MAC layer) and transform the received frames into signals that can be transmitted via radio of the network controller 302. PHY 310 may include intermediate-frequency amplifiers, analog-to-digital converters, inverse Fourier transform modules, deparsing modules, interleavers, error correction modules, scramblers, PHY-MAC padding layers, and other components. In some implementations, all PHY 310 components may be integrated on the same chip. In some implementations, PHY 310 may be further integrated on the same chip with MAC 320. In other implementation, some components, e.g. the analog-to-digital converters and/or intermediate-frequency amplifiers, may be executed by a separate circuitry outside PHY 310. In some implementations, some of PHY 310 components may be combined with the various fron-end module (FEM) components (not shown explicitly).

In some implementations, MAC 320 may be implemented as a logical thread of CPU 330. In other implementations, MAC 320 may be implemented as a component separate from both CPU 330 and PHYS 310. CPU 330 may be executing a logical link control in communication with memory 350. CPU 330 may prepare a data packet, such as a MAC service data unit, and provide it to MAC 320, which may add additional bytes (e.g., header bytes and/or tail bytes) to form an appropriate MAC protocol data unit (frame) before sending the protocol data unit to the PHY 310 for digital-to-analog processing, intermediate-frequency amplification, and filtering, in one implementation. The analog signal output by PHY 310 may then be provided to the FEM for radio-frequency processing and transmission through one or more of the antennas 301. The reverse process may occur when an incoming radio-frequency signal is received through the antenna(s) 301.

Network controller 302 may have various hardware and software components capable of detecting a current state of the environment, measure signal-to-noise ratio, CQI, and detect presence of ACI for various subcarriers. In some implementations, network controller 302 may be capable of performing directional measurements of the quality of radio transmission. In particular, network controller 302 may determine which spatial directions are more (or less) affected by interference. In some implementations, one or more antennas 301 may receive signals in a broad range of frequencies, representative of the state of various subcarriers of the communication channel to AP (e.g., AP 102). Signals received by antennas 301 may be input into low-noise amplifier 360 which may amplify received signals without significantly changing the signal-to-noise ratios of the signals. Amplified signals may be mixed with various local oscillators by mixer 362 and passed through one or more low-pass filters 364. The parameters of the local oscillators may be controlled by a logic (e.g., logic controlling subcarrier testing being performed) to selectively probe various subcarriers.

In some implementations, to compute the optimal range of subcarriers, network controller 302 may use hardware ACI (HW ACI) module 370. HW ACI module 370 may perform detection of ACI strength for various subcarriers. As depicted in FIG. 3, HW ACI module 370 may receive outputs from low-noise amplifier 360, mixer 362, and low-pass filter(s) 364. The outputs may include received signal strength indicators (RSSI) for various subcarriers. Based on RSSI signals, HW ACI module 370 may identify whether interference is present in various subcarriers and further determine an extent (e.g., characterized by a power) of the interference. The detected power may be measured in various units, such as mW, dBm, or any other units. In some implementations, ACI power may be ranked using a discrete scale, e.g., "high," "medium," "low," and so on.

Additional outputs from the low-pass filter 364 may be input into analog-to-digital converter and processed by a spectral analyzer 368. Spectral analyzer 368 may include Hilbert filters, fractional delay filters (e.g., Farrow filters), and/or other filters that can be used to measure energy at a band edge. The Hilbert filters may be used to compute frequencies at which interference (e.g., ACI) is present. Spectral analyzer 367 may additionally include energy detectors that may detect presence of ACI even when ACI power is not sufficiently high for wideband RSSI detectors to clip. In some implementations, to detect presence of ACI, HW ACI module 370 may determine a number of narrow-band RSSI clip counts (e.g., as a function of power of detected signals), which may behave differently in presence and absence of ACI. In some implementations, a copy of the digital signals received by spectral analyzer 368 may be sent to PHY 310 for regular processing, such as extraction of frames from protocol data units, data packets and metadata from frames, and so on, for provisioning the extracted data to a host system 390 via a network interface 380.

In some implementations, HW ACI module 370 may provide information about presence of ACI and detected power of detected ACI to software ACI (SW ACI) module 352. Additionally, SW ACI module 352 may obtain information from spectral analyzer 368 about location of detected ACI, which may include directional data, e.g., angles of reception more (or less) affected by ACI. Based on the power and location of the ACI signal, SW ACI module 352 may compute ranges of subcarriers that could improve STA network communications, including subcarriers that are optimal for the current state of the network environment (e.g., subcarriers that are likely to ensure maximum or acceptable throughput of the wireless connection). Based on computations performed by SW ACI module 352, AFM 114 may convey, to AP, the information about expected quality of connection for various subcarriers (e.g., grouped into RU), as described above in relation to FIG. 2B, using a RUSH action frame.

The implementations described in relation to FIG. 3 are intended for illustration only. Various modifications of and departures from the architecture shown in FIG. 3 are possible. Various components shown in FIG. 3 may be omitted. Various additional components not explicitly shown may be included. In some implementations, low-noise amplifier(s) 360, mixer(s) 362, low-pass filter(s) 364 may be a part of radio circuitry of network controller 302. In some implementations, ADC 366 may be a part of PHY 310. Network controller 302 may also include PMU 340, which may manage clock/reset and power resources for the other components of the network controller 302. I/O controller 342 may enable communications with external devices and structures. In some implementations, I/O controller 342 may enable a general purpose I/O (GPIO) interface, a USB I²C module, an I²S and/or a PCM digital audio module, and other I/O components.

Memory 350 may include read-only memory (ROM) and/or random-access memory (RAM). In some implementations, AFM 114 may be implemented in software. In some implementations, AFM 114 and SW ACI module 352 may be implemented in firmware 369. In some implementation, operations of AFM 114 and SW ACI module 352 may be executed by CPU 330 or another processing device. In some implementations, operations of AFM 114 and SW ACI module 352 may be executed by a separate microcontroller or by another separate logic not shown in FIG. 3.

Figure 4:
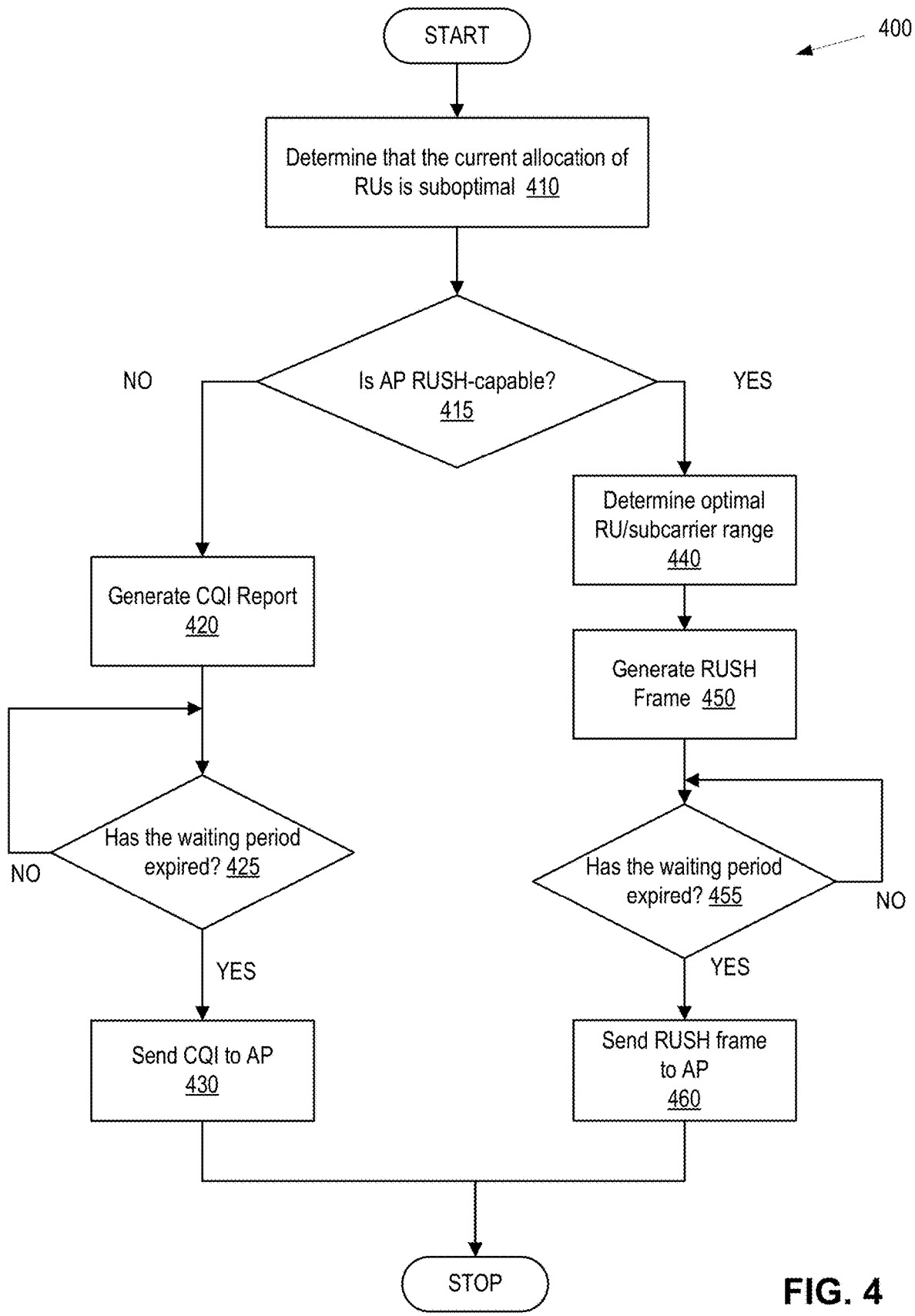
FIG. 4 is a flowchart depicting example operations of a station device capable of requesting allocation of a different set of wireless subcarriers by an access point, in accordance with some implementations of the present disclosure.

FIG. 4 is a flowchart depicting example operations 400 of a station device capable of requesting allocation of a different set of wireless subcarriers by an access point, in accordance with some implementations of the present disclosure. In some implementations, operations 400 may be performed by a network controller that is similar to network controller 302 depicted in FIG. 3. At block 410, network controller may determine that the current allocation of subcarriers (e.g., combined into various RU) by an AP for the STA is suboptimal. For example, the network controller may have detected that one or more transmissions by AP during a STA downlink phase has failed or occurred with a bandwidth that is inferior to the bandwidth previously supported by the currently allocated set of subcarriers. At block 415, the network controller may determine if the AP device communicating with STA is capable of receiving RUSH action frames with information about preferred (by STA) subcarriers. For example, the network controller may access information (e.g., stored in memory 350) previously received from AP that identifies whether AP is RUSH-compatible. In some implementations, communication that AP is capable of receiving and interpreting RUSH frames may occur during an initial authentication-association exchange between AP and STA, when the wireless connection is first established.

In some implementations, AP may be a legacy device incapable of interpreting RUSH frames. Having determined that AP is a legacy device (e.g., by not finding in memory 350 a confirmation of the RUSH-compatibility of AP), the network controller may generate data characterizing channel quality for various subcarriers of the communication channel used by AP. In some implementations, the generated data may have a format that is the same or similar to an CQI report that is generated during a channel sounding exchange between AP and STA. At block 425, the network controller may wait a first (predetermined) waiting time before sending the report to AP. The first waiting time may be 5 us, 10 us, 20 us, or any other time as may be set by a STA manufacturer or by the network controller. If the problem that triggered generation of the report has resolved over the first waiting time (e.g., an interference has decreased or a physical object hindering transmission has moved away), the network controller may forfeit sending the generated report to AP. In some implementations, the network controller may nonetheless preserve the report for at least a second (predetermined) waiting time (e.g., 0.1 ms, 0.5 ms, or any other time) to ensure that the problem is not to reoccur. If the same (or some other) communication problem reoccurs within the second waiting time, the network controller may send the report to AP, at block 430. In some implementations, the same (or some other) problem reoccurs within the second waiting time, the network controller may restart the clock and wait for the first waiting time before sending, at block 430, the report to AP. In some implementations, if the problem reoccurs after the expiration of the second waiting time, the network controller may generate a new report, which may characterize better (than the previous report) the current state of the wireless network (which may have changed since the previous report was generated).

If, at block 415, the network controller determines that the AP device is capable of processing RUSH frames, the network controller may, at block 440, determine the optimal allocation of subcarriers (e.g., grouped into RU) that would improve the current state of AP-STA communications. In some implementations, such determination can be made using various modules and components capable of probing a current state of the wireless network, e.g., as described in relation to FIG. 3. At block 450, the network controller may generate a RUSH frame, which may be a RUSH frame of any of the types described in relation to FIG. 2B, or any other type of action frame capable of communicating to AP a preferred order of subcarriers, a list of subcarriers ranked in the order of communication quality, or any other listing of subcarriers that could improve on the current scheme of subcarrier allocation. At block 425, the network controller may observe one or more waiting periods substantially as described in relation to block 425, including postponing sending a RUSH frame to the AP for the duration of the first waiting time to observe whether the problem that triggered generation of the RUSH frame resolves on its own, whether the problem reemerges within the second waiting time, and so on. If the problem is not resolved within the first waiting time or reoccurs within the second waiting time, the network controller may, at block 430, send the RUSH frame to the AP.

Having receive the CQI report, the AP (e.g., AFP 104) may perform computations to determine the new allocation of subcarriers to STA to improve transmission of data to STA. In some implementations, the AP may allocate the subcarriers that provide maximum performance to STA. In some implementations, the AP may allocate the subcarriers based on the needs of other devices supported by the AP. For example, if another client device is only capable of connecting via a set of subcarriers that also provides maximum throughput to STA, but STA is also capable of having an acceptable throughput via a second (third, etc.) choice of subcarriers, the AP may allocate such second (third, etc.) choice to STA while maintaining allocation of the top choice to the other client device. Likewise, having received the RUSH action frame (in RUSH-compatible implementations), the AP may decide which subcarrier (or subcarriers grouped into RU) are to be allocated to STA. Unlike in the instances where an CQI report is received, the AP may skip performing determination of the optimal subcarriers for STA, since such determination may have already been carried out by STA (e.g., at block 440).

Figure 5:
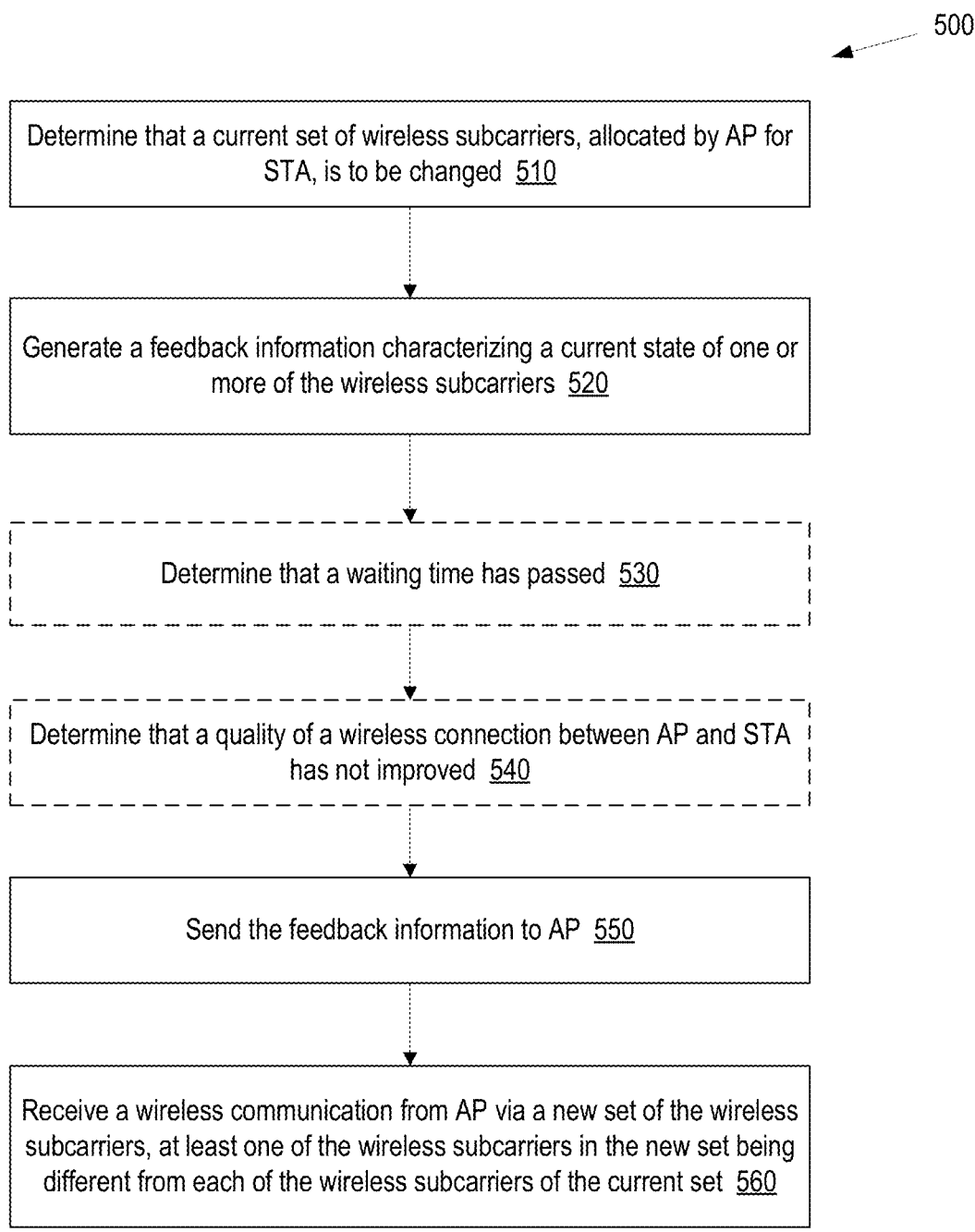
FIG. 5 is a flow diagram of an example method of optimizing performance of wireless networks by enabling autonomous subcarrier feedback, in accordance with some implementations of the present disclosure.

FIG. 5 is a flow diagram of an example method 500 of optimizing performance of wireless networks by enabling autonomous subcarrier feedback, in accordance with some implementations of the present disclosure. The wireless network may be the wireless network 100. In some implementations, method 500 is performed by a network controller that is similar to network controller 302 depicted in FIG. 3. Method 500 may be performed by a processing logic of the network controller that may include hardware (e.g., circuitry, dedicated logic, programmable logic, microcode, etc.), software, firmware or a combination thereof. Method 500 may be performed by a network controller of a station device (STA) connected to a wireless network, the network connectivity provided by an access point device (AP). At the start of the connection between AP and STA, AP may allocate a set of wireless subcarriers for STA. In some implementations, various wireless subcarriers may be grouped into resource units (RU) based on one of possible RU-grouping schemes. For example, in various implementations, a number of subcarriers within a RU may be 26, 52, 106, 242, 484, 996, or any other number of subcarriers as may be set by a standard or protocol used by AP.

Method 500 may include determining, at block 510, by a station device in a wireless network, that the current set of wireless subcarriers, allocated by AP for STA, is to be changed. For example, the network controller of STA may have detected deterioration of the quality of the wireless connection, via the current set of the wireless subcarriers, between the access point device and the station device. In particular, the network controller may have determined that at least some of the current set of the wireless subcarriers is characterized by a signal-to-noise ratio that is less than a predetermined value. In some implementations, the network controller may have determined that deterioration of the wireless connection may be due to same-channel or adjacent-channel interference occurring for at least some wireless subcarriers currently allocated for STA.

At block 520, method 500 may continue with the network controller generating a feedback information characterizing a current state of one or more of the wireless subcarriers. In implementations involving legacy AP, the feedback information may be in a format of a Channel Quality Information (CQI) report that is being provided from stations to AP as part of channel sounding exchanges. Unlike reports generated during standard channel sounding exchanges, the feedback information generated by STA in response to deterioration of the network conditions may be unsolicited, in a sense that no action on the part of AP causes STA to generated such feedback information. In some implementations, the feedback information may be a part of a feedback frame that is being prepared (e.g., by a PHY layer or a MAC layer of the network controller) in a format identifiable by AP as a request to change the current set of the wireless subcarriers allocated for STA.

In some implementations, the feedback information may include a preferred, by STA, order of at least some of the wireless subcarriers. In some implementations, the wireless subcarriers may be indexed by an RU identifier that identifying a respective RU. In some implementations, the feedback information may include a preferred, by STA, order of at least some of the wireless subcarriers. In some implementations, the feedback information may identify frequency ranges of the wireless subcarriers preferred by STA (e.g., subcarriers identified in an order of preference, in order of quality, and so on).

Method 500 may continue with the network controller determining whether a waiting time has passed. In those instances where the quality of wireless subcarriers currently allocated to STA improves over the waiting time (e.g., a transient interference that is quickly resolved), the network controller may forfeit providing the feedback information (e.g., CQI report, feedback frame, or some other type of feedback information container) to AP. If, it is determined, at block 530, that the waiting time has elapsed, but that the quality of the wireless connection between the access point and the station device has not improved (block 540), the network controller may, at block 550, send the feedback information to AP.

At block 560, method 500 may continue with STA receiving a wireless communication (e.g., a data frame, a management frame, or any other type of information) from AP via a new set of the wireless subcarriers. The new set of the wireless subcarriers may be chosen by AP to improve wireless connection to STA and may be based on the feedback information provided by STA. In some implementations, at least one of the wireless subcarriers in the new set may be different from each of the wireless subcarriers of the set of subcarriers that had been used by STA prior to deterioration of the quality of the network connection. Some operations of method 500 may be optional. For example, operations of blocks 530 and 540 may be optional (as depicted schematically with dashed boxes in FIG. 5.)

Figure 6:
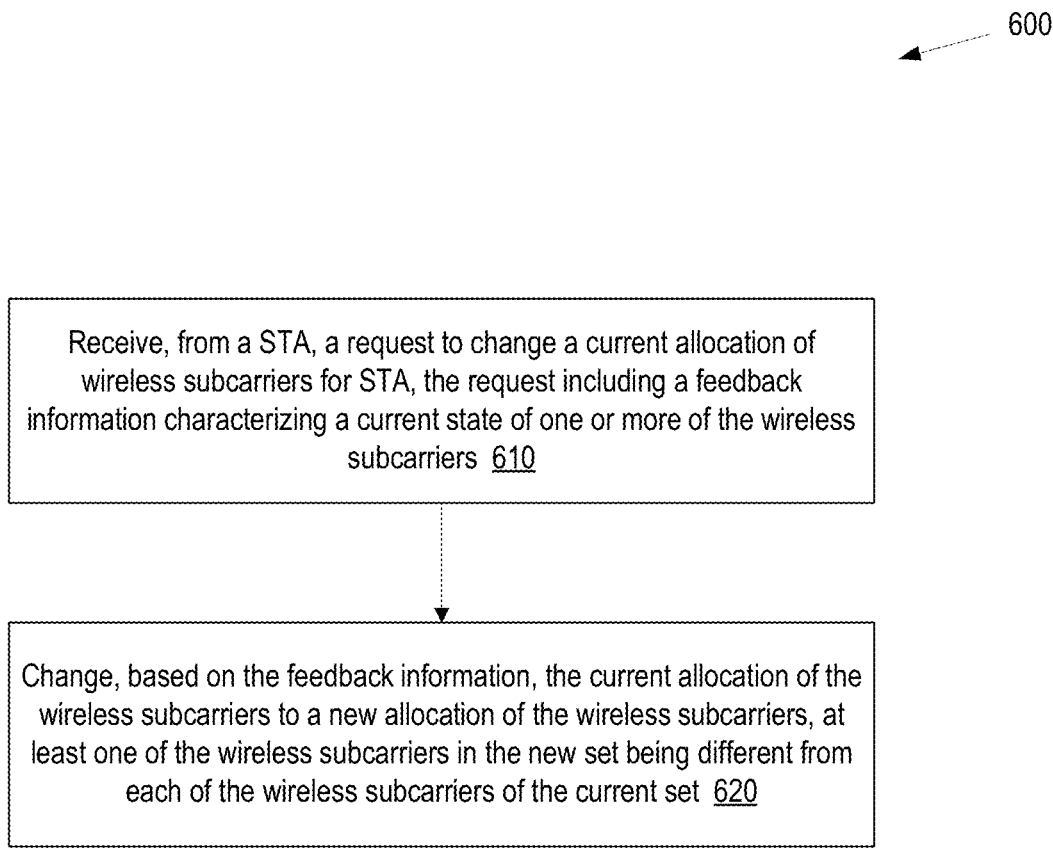
FIG. 6 is a flow diagram of an example method of optimizing performance of wireless networks using autonomous subcarrier feedback, in accordance with some implementations of the present disclosure.

FIG. 6 is a flow diagram of an example method 600 of optimizing performance of wireless networks using autonomous subcarrier feedback, in accordance with some implementations of the present disclosure. The wireless network may be the wireless network 100. In some implementations, method 600 is performed by AP of the wireless network 100 (e.g., by APF 104). Method 600 may be performed (by AP) concurrently with method 500 (performed by STA).

At block 610, AP performing method 600 may receive, from STA, a request to change a current allocation of wireless subcarriers for STA. The request may include a feedback information characterizing a current state of one or more of the wireless subcarriers. In some implementations, the feedback information may be generated by STA as part of operations of block 520 and communicated by STA to AP as part of operations of block 550 of method 500. For example, the feedback information may be received in conjunction with a feedback frame, the feedback frame being in a format identifiable by the access point device as a request to change the current set of wireless subcarriers allocated for the station device. Alternatively, the feedback information may be received as part of an unsolicited CQI report. At block 620, method 600 may continue with AP changing, based on the feedback information, the current allocation of the wireless subcarriers for STA to a new allocation of the wireless subcarriers, such that wherein at least one of the wireless subcarriers in the new set is different from each of the wireless subcarriers of the current set. The new set of the wireless subcarriers may be chosen by AP to improve wireless connection to STA and may be based on the feedback information provided by STA.

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   determining, by a station device in a wireless network, a set of wireless subcarriers allocated to the station device in a configuration operation;
   collecting, by the station device, information regarding the quality of the wireless subcarriers;
   generating, by the station device, unsolicited, by an access point device, feedback information characterizing the quality of the plurality of the wireless subcarriers; and
   sending, by the station device, the feedback information in a wireless feedback message, the feedback information comprising
   a plurality of resource unit (RU) identifiers for the wireless subcarriers, and
   a current quality value for each RU.

2. The method of claim 1, wherein the current quality value for each RU comprises a signal-to-noise ratio value.

3. The method of claim 1, wherein the generating the unsolicited feedback information in response to a change in the physical surroundings of the station device.

4. The method of claim 1, wherein:
the feedback message further includes a trigger request,
the feedback message configured for receipt by the access point device, and
the trigger request configured to indicate to the access point device to request feedback information from at least one other station device.

5. The method of claim 1, wherein the collecting of information regarding the quality of the wireless network includes determining a received signal strength indicator for the wireless subcarriers.

6. The method of claim 1, wherein the feedback information is in a format of a Channel Quality Information (CQI) report.

7. The method of claim 1, further comprising, prior to sending the feedback information message,
determining that a waiting time period has passed; and
determining that a change in quality of the wireless subcarriers continues.

8. The method of claim 1, further comprising:
receiving, by the station device, a wireless communication via the access point device indicating a new set of the wireless subcarriers, wherein at least one of the wireless subcarriers in the new set is different from each of the wireless subcarriers of the current set.

9. The method of claim 1, further comprising:
receiving, by the access point device, the feedback message; and
executing computations, by the access point device, in response to the feedback information.

10. An apparatus comprising:
a memory; and
a processing device coupled to the memory, the processing device configured to:
determine a set of wireless subcarriers allocated by a configuration operation;
collect information regarding the quality of the wireless subcarriers;
generate unsolicited, by an access point device, feedback information characterizing the quality of the plurality of the wireless subcarriers; and
send the feedback information in a wireless feedback message, the feedback information comprising
a plurality of resource unit (RU) identifiers for the wireless subcarriers, and
a current quality value for each RU.

11. The apparatus of claim 10, wherein the processing device is further configured to send the feedback message in response to at least one wireless carrier falling below a predetermined quality value.

12. The apparatus of claim 10, wherein the processing device is further configured to generate the unsolicited feedback information in response to a change in the physical surroundings of the apparatus.

13. The apparatus of claim 10, wherein feedback message is compatible with at least one IEEE 802.11 wireless standard.

14. The apparatus of claim 10, wherein the current quality value for each RU comprises a signal-to-noise ratio.

15. The apparatus of claim 10, wherein the current quality value for each RU comprises a received signal strength indicator.

16. A system comprising:
one or more antennas; and
a wireless network controller coupled to the one or more antennas,
wherein the wireless network controller is configured to:
determine a current set of wireless subcarriers, allocated by an access point device of a wireless network to a station device;
generate an unsolicited, by the access point device, feedback information characterizing a current state the wireless subcarriers; and
send the feedback information message in a wireless feedback message to the access point device, wherein the feedback information comprises:
resource unit (RU) identifiers for the wireless subcarriers, and
a current quality value for each RU.

17. The system of claim 16, wherein the wireless network controller is configured to generate the unsolicited feedback information in response to a predetermined change in quality of at least one wireless subcarrier.

18. The system of claim 16, wherein the wireless network controller is configured to generate the unsolicited feedback information in response to a change in the physical surroundings of the network controller.

19. The system of claim 16, further including:
the access point device is configured to
wirelessly receive the feedback message, and
execute computations in response to at least the feedback information.

20. The system of claim 19, wherein:
the access point device is configured to execute the computations in response to additional feedback information from a plurality of other wireless network controllers; wherein
the additional feedback information includes
resource unit (RU) identifiers for wireless subcarriers for the other wireless network controllers, and
a current quality value for the RUs for the other wireless network controllers.

* * * * *